United States Patent
Soddu et al.

(10) Patent No.: US 9,447,209 B2
(45) Date of Patent: Sep. 20, 2016

(54) PROCESS FOR THE PREPARATION OF DIENE POLYMERS OR OF RANDOM VINYL ARENE-DIENE COPOLYMERS

(71) Applicant: Versalis S.P.A., San Donato Milanese (IT)

(72) Inventors: Luca Soddu, Bologna (IT); Antonio Giuseppe Solito, Ravenna (IT)

(73) Assignee: Versalis S.P.A. (IT)

( * ) Notice: Subject to any disclaimer, the term of this patent is extended or adjusted under 35 U.S.C. 154(b) by 0 days.

(21) Appl. No.: 14/417,928

(22) PCT Filed: Aug. 30, 2013

(86) PCT No.: PCT/IB2013/058169
§ 371 (c)(1),
(2) Date: Jan. 28, 2015

(87) PCT Pub. No.: WO2014/037861
PCT Pub. Date: Mar. 13, 2014

(65) Prior Publication Data
US 2015/0203611 A1    Jul. 23, 2015

(30) Foreign Application Priority Data

Sep. 7, 2012 (IT) .............. MI2012A1495

(51) Int. Cl.
| | |
|---|---|
| C08F 4/46 | (2006.01) |
| C08F 36/00 | (2006.01) |
| C08F 12/02 | (2006.01) |
| C08F 36/06 | (2006.01) |
| C08C 19/44 | (2006.01) |
| C08F 236/10 | (2006.01) |

(52) U.S. Cl.
CPC ............... C08F 36/06 (2013.01); C08C 19/44 (2013.01); C08F 236/10 (2013.01)

(58) Field of Classification Search
CPC ...... C08C 19/44; C08F 236/10; C08F 36/06; C08F 4/48
USPC ........................................ 526/335, 346, 173
See application file for complete search history.

(56) References Cited

U.S. PATENT DOCUMENTS

| | | | |
|---|---|---|---|
| 3,303,225 A * | 2/1967 | Hsieh ................. | C07F 1/00 260/665 R |
| 4,540,744 A * | 9/1985 | Oshima ............... | C08C 19/44 525/314 |
| 5,914,378 A | 6/1999 | Viola et al. | |
| 6,858,683 B2 | 2/2005 | Viola et al. | |

FOREIGN PATENT DOCUMENTS

| | | |
|---|---|---|
| EP | 0476640 A1 | 3/1992 |
| EP | 0476641 A1 | 3/1992 |
| EP | 0476662 A1 | 3/1992 |
| EP | 0476665 A1 | 3/1992 |
| EP | 0491199 A1 | 6/1992 |
| EP | 0491229 A1 | 6/1992 |
| EP | 1829906 | 9/2007 |
| GB | 952654 A | 3/1964 |
| GB | 1142101 | 2/1969 |

OTHER PUBLICATIONS

"Application Note" (1996), Nr. 9, Wyatt Technology.
Kratochvil, "Classical Light Scattering from Polymer Solutions" (1987), Polymer Science Library, 5, Elsevier Science Publishers B.V.
International Search Report dated Jan. 8, 2014 for PCT/IB2013/058169.

\* cited by examiner

*Primary Examiner* — William Cheung
(74) *Attorney, Agent, or Firm* — Abel Law Group, LLP

(57) ABSTRACT

Process for the preparation of diene polymers or random vinyl arene-diene copolymers which comprises (co)polymerizing, anionically, in the presence of at least one hydrocarbon solvent, at least one conjugated diene monomer and optionally at least one vinyl arene, in the presence of at least one lithium-based initiator, at least one aprotic polar compound, and at least one compound containing one or more functional groups of the acetylenic type. Said process allows diene polymers or random vinyl arene-diene copolymers to be obtained, which can be advantageously used in the production of tires, in particular in the production of tire treads. The diene polymers or the random vinyl arene-diene copolymers obtained through said process can also be used for the modification of plastic materials [for example, for obtaining high impact polystyrene (HIPS)].

16 Claims, No Drawings

PROCESS FOR THE PREPARATION OF DIENE POLYMERS OR OF RANDOM VINYL ARENE-DIENE COPOLYMERS

This application is the National Stage under 35 USC 371 of PCT application PCT/IB2013/058169 with an international filing date of 30 Aug. 2013. The application claims foreign priority of application MI2012A001495 filed in Italy on Sep. 7, 2012.

The present invention relates to a process for the preparation of diene polymers or of random vinyl arene-diene copolymers.

More specifically, the present invention relates to a process for the preparation of diene polymers or of random vinyl arene-diene copolymers, which comprises (co)polymerizing, anionically, in the presence of at least one hydrocarbon solvent, at least one conjugated diene monomer and, optionally, at least one vinyl arene, in the presence of at least one lithium-based catalyst, at least one aprotic polar compound, and at least one compound containing one or more functional groups of the acetylenic type.

Said process allows the stability of the living chain-end to be modified and, more generally, its reactivity with respect to the protons optionally present in alpha position with respect to the heteroatoms (i.e. oxygen or nitrogen) of the above-mentioned aprotic polar compound (modifier) and to the allyl and/or benzyl protons present on the chains of the diene polymers or of the random vinyl arene-diene copolymers obtained and, consequently, to obtain a higher control of the anionic (co)polymerization in the presence of lithium-based initiators and of aprotic polar compounds, and therefore on the micro- and macro-structural characteristics of the diene polymers or of the random vinyl arene-diene copolymers deriving therefrom.

Said process allows diene polymers or random vinyl arene-diene copolymers to be obtained, which can be advantageously used in the production of tyres, in particular in the production of tyre treads. The diene polymers or the random vinyl arene-diene copolymers obtained by means of said process can also be used in the modification of plastic materials [for example, for obtaining high impact polystyrene (HIPS)].

The use of lithium-based catalysts in "living" anionic (co)polymerization in order to obtain diene (co)polymers, is widely described in literature in its fundamental characteristics, as also the use of aprotic polar compounds (modifiers) for controlling the microstructure of the end-product (i.e., the content of 1,4-trans and 1,4-cis chains and of 1,2-vinyl units in the conjugated diene monomer and the random nature of the distribution of the monomers in the case of a copolymerization reaction).

Said (co)polymerization typically provides diene (co)polymers in which the polydispersity index, corresponding to the ratio between the weight average molecular weight ($M_w$) and the number average molecular weight ($M_n$) (i.e. to the $M_w/M_n$ ratio) strictly depends on the type of process used for the synthesis of the same. From a batch process, for example, diene (co)polymers can be obtained, having a polydispersity index ($M_w/M_n$)<1.3, whereas, from a continuous process, diene (co)polymers can be obtained, having a polydispersity index ($M_w/M_n$) which depends on the number of reactors [reactors of the CSTR (Continuous Stirred-Tank Reactor) type, for example] used in series and on the conversion degree corresponding to each reactor of the series. In the case of the use of reactors in series of the ideal CSTR type and in the presence of a living anionic (co)polymerization without termination reactions, for example, diene (co)polymers should be obtained having a polydispersity index ($M_w/M_n$)≤2, whereas, under real conditions, diene (co)polymers having a polydispersity index ($M_w/M_n$)≤2.3, are obtained.

It is also known that the branching degree of diene (co)polymers can be controlled through the use of various processes. As a non-exhaustive example, the following processes can be mentioned:

coupling reaction of the living chain-ends with halides of elements belonging to group IV of the Periodic Table of Elements, having general formula $R'_{4-n}MCl_n$ wherein n=3 or 4 (such as, for example, silicon tetrachloride ($SiCl_4$) or tin tetrachloride ($SnCl_4$);

formation of random branching by the production in situ of primary radicals through the reaction between alkyl or allyl carbanions and alkyl bromides, as described, for example, in american U.S. Pat. No. 6,858,683.

Although the processes reported above are defined "living", there are in reality various side-reactions which relate to the synthesis of homopolymers and copolymers from diene and vinyl aromatic monomers which lead to the deactivation of the reactive chain-end. This depends on the operative conditions of the reaction environment such as, for example, temperature, concentration of the free monomer, type and/or concentration of the modifier (for example, an aprotic polar compound). The above side-reactions, as better illustrated hereunder, can cause a broadening of the molecular-weight distribution, which is particularly evident in the case of a continuous process in which at least two reactors of the CSTR type are used in series: in this case, in fact, the polydispersity index ($M_w/M_n$) can range from about 2 to about 3.

The above side-reactions which cause the deactivation of the reactive terminal, can be divided into two different groups.

The first group comprises termination due to the reaction with protons, preferably in alpha position with respect to the heteroatoms of ethers and/or amines, compounds normally used as modifiers in the anionic (co)polymerization of diene and optionally vinyl aromatic monomers. This reaction is generally significant at temperatures higher than 50° C. and depends on the chemical nature of the modifier used, i.e. on the capacity of the latter to form stable complexes with the lithium cation. It is known, in fact, that the effect of a modifier on the kinetic parameters of the anionic (co) polymerization reaction (e.g., homopolymerization constants, quantity of units of the 1,2-vinyl type, "cross-over" constants in the copolymerization) depends on its capacity of forming stable complexes with the counter-ion ($Li^+$), in addition to its concentration. In this sense, the use of chelating ethers, i.e. of compounds having two oxygen atoms, separated by 2 or 3 carbon atoms, provides, at concentrations of a few hundreds of ppm, homopolymerization constants of butadiene and of styrene which, at the same temperature, are obtained at concentrations two orders of magnitude higher, using non-chelating ethers (also called solvating agents) such as, for example, tetrahydrofuran (THF). Chelating ethers generally have an equally marked effect on the quantity of units of the 1,2 vinyl type and on the "cross-over" constants in the copolymerization. In the latter case, copolymers are generally obtained, having a distribution of the monomeric units which is closer to the ideal (random copolymers). Non-limiting examples of chelating ethers which can be advantageously used are 2-methoxyethyl-tetrahydrofuran (THPA-ethyl) and 2-methoxyethyl-tetrahydropyrane (THPA-ethyl), the latter described, for example, in american U.S. Pat. No. 5,914,378.

Actually, it has been observed that the improvement in the kinetic parameters of (co)polymerization processes through the use of particularly effective chelating ethers, comes into conflict with the stability of the living carbanion chain-end. Chelating ethers which strongly interact with the lithium cation (Li$^+$), in fact, favour the termination of the carbanion through the reaction between the same and the protons which are in alpha position with respect to the oxygen atoms of the chelating ether. In order to overcome this drawback and therefore to obtain (co)polymers having micro- and macro-structural characteristics suitable for different fields of application, optimal operative conditions have been sought (i.e., type of modifier and process parameters) as described, for example, in european patent EP 1,829,906.

A second group, on the contrary, provides for the termination by reaction with an allyl proton of an already-formed polydiene chain (metalation reaction). This reaction represents the first step of a series of reactions which lead to the thermal formation of branchings. Experimental evidence shows that there is a significant mechanism at temperatures higher than about 90° C., in the presence of modifiers. In the absence of the latter, such as, for example, in the case of the synthesis of a polybutadiene with a content of 1,2-vinyl units equal to about 10%, on the contrary, the reaction becomes significant at temperatures higher than about 110° C.

In both cases, the above termination reactions have a significant influence on the macrostructure of the (co)polymers obtained and, consequently, on the management of the synthesis processes: the effects of these termination reactions can be summarized as follows.

A progressive reduction in the concentration of the living chain-ends can be observed during the homo- and co-polymerization reaction. This has considerable effects on the effectiveness of possible post-modification reactions which depend on the concentration of the living chain-ends. Coupling reactions can be mentioned, for example, with compounds having general formula $R'_{4-n}MCl_n$ cited above, which are used for producing star-shaped (co)polymers, which introduce non-statistical branchings in the end-product. The maximum content of branchings that can be obtained for structures of this type, expressed as coupling efficiency in weight percentage with respect to the total mass of macromolecules, is obtained when the coupling agent is fed stoichiometrically with respect to the total concentration of the carbanion chain-ends present in the reaction environment which, as previously described, decreases with time due to the termination reactions. Furthermore, the progressive reduction in the concentration of the living chain-ends creates rather strict limits in the running of processes, carried out both in batch and in continuous, associated with the production of (co)polymers having a relatively high molecular weight (i.e. $M_n$>250,000 dalton) as the necessity of completely eliminating free monomers from the reaction environment cannot be satisfied by indefinitely increasing the reaction times and/or temperatures.

Or, (co)polymers can be obtained having long-chain branchings (LCB). With respect to the case represented by a linear, monodispersed (co)polymer, a significant variation in some of the fundamental rheological properties of the end-product is obtained, such as, for example, the pseudo-plasticity, and the characteristics linked to elongational-type flows. In the field of elastomers, in particular for application in tyre treads in which styrene-butadiene copolymers obtained in solution (SSBR—Solution Styrene Butadiene Rubber), the processability, referring to the time necessary for forming a blend between one or more elastomers, the reinforcing filler, typically carbon black or silica, and the vulcanizing formulation, together with the final quality of the same (i.e., optimum dispersion of the ingredients) is another essential characteristic which greatly depends on the presence or absence of branchings: said processability is generally improved by the presence of a certain degree of long branchings. It is known, in fact, that the quality of the blend depends on the quality of the elastic network after the vulcanization reaction, and consequently the dynamic properties of the end-product, i.e. the tyre, such as, for example, the rolling resistance and the hysteretic properties linked to wet grip and braking, derive from this. In the case of a polybutadiene having a low content of 1,2-vinyl units, obtained through a continuous process, the presence of long branchings is important for reducing the tendency of the polymer obtained to undergo cold plastic deformation (cold flow), with consequent problems in handling during storage and also during the final use of the bales of the end-product. Depending on the technology used for the production of tyres, it may be preferable and suitable, however, to use (co)polymers having a reduced, or even null, quantity of long-chain branchings (LCB).

In fact, it is also known that an excessive quantity of long-chain branchings (LCB) can have a negative effect on the final properties of the end-product in applications sudh as, for example, the modification of plastic materials [for example, the production of high impact polystyrene (HIP)] with respect, for example, to the surface gloss.

Or, (co)polymers can be obtained having a broader molecular-weight distribution, i.e. having a polydispersity index $(M_w/M_n)$>2.5. Said molecular-weight distribution derives from the formation of long-chain branchings (LCB) and also from a variation in the concentration of the living chain-ends in relation to the reaction time. This polydispersity index is also a parameter which significantly influences some of the fundamental rheological characteristics of the (co)polymer obtained: it can be observed, in fact, that there is a progressive deterioration in the characteristics of the blend for polydispersity index values $(M_w/M_n)$>2.5, and this is reflected on the behaviour of the end-product (tyre tread, for example).

English patent GB 1,142,101 describes another method for the polymerization of butadiene or a mixture thereof with styrene, α-methyl styrene or vinyl toluene, in an inert hydrocarbon solvent, characterized in that the polymerization is initiated by a lithium acetylide, obtaining a polymer having a wide molecular-weight distribution [i.e. having a polydispersity index $(M_w/M_n)$ equal to 3, or 4, or 5, up to 20 or 30].

Due to the effect of chain-end reactions on the rheological properties of the obtained (co)polymers and, consequently, on the final characteristics of the end-products made from them, the necessity of being able to effectively control them in order to obtain (co)polymers with "optimized" characteristics on the basis of the final application, is evident.

The Applicant therefore faced the problem of finding a process for the preparation of diene polymers or of random vinyl arene-diene copolymers, which allows a higher control of both the branching degree and of the molecular-weight distribution.

The Applicant has now found that diene polymers or random vinyl arene-diene copolymers having different branching degrees and different molecular-weight distributions can be obtained through a process which comprises the anionic (co)polymerization, in the presence of at least one hydrocarbon solvent, of at least one conjugated diene monomer and, optionally, of at least one vinyl arene, in the presence of at least one lithium-based catalyst, of at least one aprotic polar compound and of at least one compound containing one or more functional groups of the acetylenic type. In particular, the Applicant has found that the use of said compound containing one or more functional groups of the acetylenic type is capable of influencing the reactivity of the living chain-ends with respect to the protons optionally present in alpha position with respect to the heteroatoms (i.e. oxygen or nitrogen) of the above-mentioned aprotic polar compound (modifier) and to the allyl and/or benzyl protons in the direction of increasing their stability and, consequently, of reducing the quantity of non-reacted monomers at the end of the (co)polymerization. Furthermore, the use of said compound containing one or more functional groups of the acetylenic type, is capable of increasing the control on the thermolysis reaction and of limiting, or even of preventing, the formation of long-chain branchings. The use of said compound containing one or more functional groups of the acetylenic type, is also capable of improving the thermomechanical stability of the (co)polymer obtained, through a reduction in the content of conjugated polyenes deriving from the above thermolysis reaction. Said process allows diene polymers or random vinyl arene-diene copolymers to be obtained, which can be advantageously used in the production of tyres, in particular in the production of tyre treads. The diene polymers or the random vinyl arene-diene copolymers obtained through said process can also be used for modifying plastic materials [for example, for obtaining high impact polystyrene (HIPS)].

An object of the present invention therefore relates to a process for the preparation of diene polymers or of random vinyl arene-diene copolymers, which comprises (co)polymerizing, anionically, in the presence of at least one hydrocarbon solvent, at least one conjugated diene monomer and, optionally, at least one vinyl arene, in the presence of at least one lithium-based initiator, at least one aprotic polar compound, and at least one compound containing one or more functional groups of the acetylenic type.

For the purposes of the present description and of the following claims, the definition of the numerical ranges always include the extremes, unless otherwise specified.

For the purposes of the present description and of the following claims, the term "comprising" also includes the terms "which essentially consists of" or "which consists of".

According to a preferred embodiment of the present invention, said hydrocarbon solvent can be selected, for example, from aliphatic or aromatic hydrocarbon solvents such as, for example, n-pentane, n-hexane, heptane, cyclohexane, or mixtures thereof. n-Hexane, cyclohexane, or mixtures thereof are preferred.

Said organic solvent is preferably as anhydrous as possible and free of protogenic substances. A distillation followed by treatment on alumina beds and molecular sieves 3A or 4A is sufficient for obtaining a suitable solvent.

According to a preferred embodiment of the present invention, said conjugated diene monomer can be selected, for example, from conjugated diene monomers having from 4 to 12 carbon atoms, preferably from 4 to 8 carbon atoms, such as, for example, 1,3-butadiene, isoprene, 2,3-dimethyl-1,3-butadiene, 1,3-pentadiene(piperylene), 2-methyl-3-ethyl-1,3-butadiene, 1,3-octadiene, 1,3-Butadiene, isoprene, or mixtures thereof, are preferred. 1,3-Butadiene is particularly preferred.

According to a preferred embodiment of the present invention, said vinyl arene can be selected, for example, from: styrene, α-methylstyrene, 1-vinyl-naphthene, 2-vinyl-naphthene, or alkyl derivatives thereof, or mixtures thereof. Styrene is preferred.

According to a preferred embodiment of the present invention, said process can be carried out in the presence of:
60% by weight-100% by weight, preferably 70% by weight-100% by weight, with respect to the total weight of the conjugated diene monomer and of the optional vinyl arene, of at least one conjugated diene monomer;
0% by weight-40% by weight, preferably 0% by weight-30% by weight, with respect to the total weight of the conjugated diene monomer and of the optional vinyl arene, of at least one vinyl arene.

The quantity of the hydrocarbon solvent used in said process is generally such as to allow the complete solubility of the monomers (i.e. conjugated diene monomer and optional vinyl arene), of the additives optionally present and of the elastomeric (co)polymer obtained at the end of the (co)polymerization, the complete stirring of the reaction mixture, also during said (co)polymerization, and the dispersion of the reaction heat. Said hydrocarbon solvent is preferably used in such a quantity so as to have a concentration of monomers (i.e. conjugated diene monomer and optional vinyl arene) in the hydrocarbon solvent, ranging from 1% by weight to 30% by weight with respect to the total weight of the hydrocarbon solvent.

According to a preferred embodiment of the present invention, said lithium-based initiator can be selected, for example, from compounds having general formula (I):

$$R_1(Li)_m \quad (I)$$

wherein $R_1$ represents a linear or branched $C_1$-$C_{20}$, preferably $C_2$-$C_8$, alkyl group, and m is an integer ranging from 1 to 6, preferably ranging from 1 to 4.

According to a further preferred embodiment of the present invention, said lithium-based catalyst can be selected, for example, from: lithium-n-butyl, lithium-n-propyl, lithium-iso-butyl, lithium-tert-butyl, or mixtures thereof. Lithium-n-butyl is preferred.

According to a preferred embodiment of the present invention, said lithium-based catalyst can be used in a quantity ranging from 0.005% by weight to 0.08% by weight, preferably ranging from 0.02% by weight to 0.06% by weight, with respect to the total weight of the monomers used (i.e. conjugated diene monomer and optional vinyl arene).

According to a preferred embodiment of the present invention, said aprotic polar compound can be selected, for example, from: non-cyclic ethers, for example, ethyl ether; cyclic ethers, for example, tetrahydrofuran (THF); chelating ethers, for example, ethylene glycol dimethyl ether(dimethylglyme), dioxane, 2-methoxyethyl-tetrahydrofuran (THFA-ethyl), 2-methoxyethyl-tetrahydropyrane (THPA-ethyl); tertiary amines, for example, tributylamine; chelating amines, for example, N,N,N',N'-tetramethyleneethylenediamine (TMEDA). 2-Methoxyethyl-tetrahydrofuran (THFA-ethyl), 2-methoxyethyltetrahydropyrane (THPA-ethyl), or mixtures thereof, are preferred.

According to a preferred embodiment of the present invention, said aprotic polar compound can be used in a quantity ranging from 0.10 moles to 100 moles, preferably ranging from 0.20 moles to 50 moles, per mole of lithium-based initiator.

According to a preferred embodiment of the present invention, said compound containing one or more functional groups of the acetylenic type can be selected from compounds having general formula (II):

$$R_1-(C\equiv C-H)_n \quad (II)$$

wherein $R_2$ represents a hydrogen atom, or is selected from linear or branched $C_1$-$C_{20}$, preferably $C_2$-$C_{18}$, alkyl groups, $C_3$-$C_{20}$, preferably $C_4$-$C_{18}$, cycloalkyl groups, $C_6$-$C_{20}$, preferably $C_6$-$C_{18}$, aryl groups, said alkyl, cycloalkyl and aryl groups optionally containing one or more heteroatoms such as, for example, oxygen, nitrogen, silicon, and n is an integer ranging from 1 to 10, preferably ranging from 1 to 6.

It should be noted that in the compound having general formula (II), the hydrogen atom linked to the acetylenic group:

is characterized by a pKa which is such that it can be extracted by the lithium alkyl to form a metalated structure (i.e. metalation reaction) having general formula (III):

(III).

The pKa of an acetylenic proton is approximately 26.

According to a preferred embodiment of the present invention, said compound containing one or more functional groups of the acetylenic type, can be used in such an amount that the molar ratio between the lithium-based initiator active in the (co)polymerization and the compound having general formula (II), after the above-mentioned metalation reaction, ranges from 20 to 0.1, preferably ranges from 4 to 0.2. The (co)polymerization reaction is started, in fact, by the amount of lithium-based initiator remaining after the metalation reaction mentioned above.

According to a further embodiment of the present invention, said lithium-based initiator and said compound containing one or more functional groups of the acetylenic type, can be reacted with each other (i.e. metalation reaction) before being used in said process.

It should be noted that, as mentioned above, even when said lithium-based initiator and said compound containing one or more functional groups of the acetylenic type are reacted with each other before being used in the process object of the present invention, the molar ratio between the lithium-based initiator active in the (co)polymerization and the compound having general formula (II), after the above-mentioned metalation reaction, will be within the range of values reported above (i.e. ranging from 20 to 0.1, preferably ranging from 4 to 0.2).

According to a further preferred embodiment of the present invention, said compound containing one or more functional groups of the acetylenic type, can be selected, for example, from: acetylene, 1-propine, 1-butine, 3-methyl-1-butine, tert-butylacetylene (or 3,3'-dimethyl-1-butine), 1-heptine, 1-octine, cyclopropylacetylene, cyclopentylacetylene, cyclohexylacetylene, 2-ethinyltoluene, 3-ethinyltoluene, 4-ethinyltoluene, trimethylsilylacetylene, 1,6-heptadine, 1,7-octadine, 1,8-nonadine, propargylether (or dipropinylether), diethinylether, or mixtures thereof. tert-Butylacetylene is preferred.

The process for the preparation of diene polymers or of random vinyl arene-diene copolymers object of the present invention, can be carried out batchwise or in continuous, preferably in continuous, operating according to what is described in the art.

In the case of a continuous process, said process can be carried out using either a single reactor or, preferably, several reactors in series, normally from 2 to 5, generally reactors of the CSTR type, in order to improve the productivity and to have a better control of the (co)polymerization conditions (i.e., temperature and total conversion).

According to a preferred embodiment of the present invention, said process can be carried out in continuous, in one or more reactors in series, preferably in several reactors in series, even more preferably in 2, 3, 4 or 5 reactors in series, under isotherm conditions, operating within a temperature ranging from 30° C. to 120° C., preferably ranging from 50° C. to 100° C., with a control of ±5° C. and with a total residence time ranging from 30 minutes to 130 minutes, preferably ranging from 60 minutes to 120 minutes.

At the end of the (co)polymerization, and after any optional post-modification reactions of the (co)polymer obtained [for example, the coupling reaction of the (co)polymer obtained with a compound such as silicon tetrachloride ($SiCl_4$)], the (co)polymer solution obtained is generally collected in pressurized containers in which a suitable formulation of antioxidants is fed, defined on the basis of the field of application for which the (co)polymer is destined.

If required by the type of (co)polymer obtained and/or by the relative field of application for which it is destined, an extender oil can be added in the same pressurized containers, preferably a non-aromatic oil or with a low aromatic content, which can be selected, for example, from: MES (Mild Extraction Solvate) oils or TDAE (Treated Distillate Aromatic Extract) oils, in which the amount of aromatic compounds is lower than 20% by weight. Said extender oils can generally be added in quantities ranging from 10 parts of oil to 50 parts of oil per 100 parts of (co)polymer, preferably from 20 parts of oil to 40 parts of oil, per 100 parts of (co)polymer.

The (co)polymer obtained according to the process object of the present invention, as such or containing the extender oil, can be recovered by means of consolidated solvent extraction techniques, for example, through stripping and subsequent removal of the water and volatile residues from the lumps of (co)polymer thus obtained by passage through one or more extruders.

As mentioned above, the diene polymers or the random vinyl arene-diene copolymers obtained by means of the process object of the present invention, can be advantageously used in the production of tyres, in particular in the production of tyre-treads. In this respect, said random diene polymers or copolymers can be used alone or in a mixture with other polymeric or non-polymeric components, in the production of elastomeric blends suitable for the production of tyres, in particular tyre treads. The diene polymers or the random vinyl arene-diene copolymers obtained by means of said process can be also used in the modification of plastic materials [for example, for obtaining high impact polystyrene (HIPS)].

Some illustrative and non-limiting examples are provided for a better understanding of the present invention and for its embodiment.

EXAMPLES

The characterization and analysis techniques listed hereunder were used.

Determination of the Molecular Mass Distribution (MWD)

The determination of the molecular mass distribution (MWD), from which the polydispersity index is obtained (i.e. the $M_w/M_n$ ratio) and the molecular weight corresponding to the highest peak ($M_n$), was carried out according to the method commonly used via SEC (GPC) in tetrahydrofuran (THF), at 25° C., using PL-MIXED A (×4) columns and determination of the molecular masses according to the universal calibration method (k=0.000457 dl/g and α=0.693).

Determination of the Weight Average Molecular Weight ($M_w$) and Measurement of the Branching Index ($g_m$) by Means of the SEC/MALLS Technique The weight average molecular weight ($M_w$) and the branching index ($g_m$) were determined according to an internal method taken from the work described in "*Application Note*" (1996), Nr. 9, Wyatt Technology and by Pavel Kratochvil, "*Classical Light Scattering from Polymer Solutions*" (1987), Polymer Science Library, 5, Elsevier Science Publishers B. V.

By coupling a multi-angle light scattering detector (MALLS) with a traditional SEC/RI elution system, the absolute measurement can be contemporaneously carried out of the weight average molecular weight ($M_w$) and of the radius of gyration of the macromolecules that are separated by the chromatographic system; the quantity of light scattered by a macromolecular species in solution can in fact be used directly for obtaining its weight average molecular weight ($M_w$), whereas the angular variation of the scattering is directly correlated with its average dimensions. The fundamental relation (1) which is used is the following:

$$\frac{K*c}{R_\theta} = \frac{1}{M_w P_\theta} + 2 A_2 c \quad (1)$$

wherein:
K*=optical constant, which depends on the wavelength of the light used, on the refraction index (dn/dc) of the polymer, on the solvent used;
$M_w$=weight average molecular weight;
c=concentration of the polymeric solution;
$R_\theta$=intensity of the scattered light measured at an angle equal to θ;
$P_\theta$=function describing the variation of the light scattered with the angle at which it is measured, equal to 1 for an angle θ=0.

For very low concentrations (typical of a GPC system), the above fundamental reaction (1) is reduced to the fundamental reaction (2):

$$\frac{K*c}{R_\theta} = \frac{1}{M_w P_\theta} \quad (2)$$

and by carrying out the measurement on several angles, the extrapolation to angle null of the function $K*c/R_\theta$ in relation to $sen^2\theta/2$ directly provides the weight average molecular weight ($M_w$) from the intercept value and the radius of gyration from the slope.

Furthermore, as this measurement is carried out for every slice of the chromatogram, it is possible to obtain a distribution of both the weight average molecular weight ($M_w$) and the radius of gyration.

The macromolecular dimensions in solution are directly correlated to their branching degree: for the same weight average molecular weight ($M_w$), the smaller the dimensions of the macromolecule with respect to the linear correspondent, the higher the branching degree will be.

Informations relating to the macrostructure of the polymer is deduced in two ways:

(1) qualitatively, from the value of the parameter a, which represents the slope of the curve which correlates the radius of gyration with the weight average molecular weight ($M_w$): when, under the same analysis conditions, this value decreases with respect to a macrostructure of the linear type, there is the presence of a polymer having a branched-type macrostructure and, for example, the typical value for linear polybutadiene having a high content of 1,4-cis units, in tetrahydrofuran (THF), is equal to 0.58-0.60;

(2) quantitatively, by estimating the branching index ($g_m$) which is defined for each macromolecule as a ratio between the average square radius of gyration of the branched macromolecule ($<r_2>_b$) and the average square radius of gyration of the linear macromolecule ($<r_2>_l$), with the same molecular weight represented by the following equation (3) ($M_w$) represents the weight average molecular weight ($M_w$) of the " . . . th" molecule)

$$g_{M_i} = \left[\frac{\langle r_2 \rangle_b}{\langle r_2 \rangle_l}\right]_{M_i}. \quad (3)$$

The branching index ($g_m$) represents the average of the above ratio along the molecular masses distribution and ranges from 0 to 1.

Analysis of the Microstructure (Content of 1,2 Vinyl Units and of Bound Styrene)

The determination of the microstructure (content of 1,2 vinyl units and of bound styrene) was carried out by FTIR spectroscopy (Fourier Transform Infra Red) by means of the absorbing bands (and on the calculation of their relative intensity) characteristic of the three types of butadiene chaining: 1,4-cis (800 $cm^{-1}$ and 640 $cm^{-1}$) 1,4-trans (1018 $cm^{-1}$ and 937 $cm^{-1}$) and 1,2 (934 $cm^{-1}$ and 887 $cm^{-1}$) and of bound styrene (between 715 $cm^{-1}$ and 680 $cm^{-1}$).

Determination of the Mooney Viscosity

The determination of the Mooney Viscosity was carried out at 100° C. using a Monsanto Viscosimeter MV 2000E, method ASTM D 1646 with a type L rotor and with times 1+4 ($ML_{1+4}$@100°).

Example 1

Comparative 600 grams of anhydrous cyclohexane, 27 grams of freshly distilled anhydrous butadiene and 100 ppm of 2-methoxyethyl-tetrahydrofuran (THFA-ethyl) were charged, in this order, into a stirred 1 liter reactor equipped with a jacket for the circulation of a thermostatic fluid. The reactor is equipped with a system for the continuous measurement of the UV-Vis absorbing spectra of the polymeric solution. Said system consists of a quartz flow cell, having an optical path of 1 mm, connected to the reactor through a circuit in which a HPLC pump collects the polymeric solution, passes the same through the flow cell and sends it back to the reactor. This allows the concentration of the living butadienyl chain-end to be measured in continuous, by applying the Lambert Beer law:

$$A = l \times \epsilon \times c$$

wherein A is the absorbance, l is the optical path of the measurement cell, ε is the molar extinction coefficient (which for butadienyl in the presence of 2-methoxyethyl-tetrahydrofuran (THFA-ethyl) is about 6500 $lx \cdot cm^{-1} \times mol^{-1}$) and c is the molar concentration. The UV-Vis spectrum was measured using a Perkin Elmer Lambda 25 spectrophotometer within the range of 260 nm to 400 nm, at intervals of 2 minutes between one measurement and another, in order to measure the amount of the termination reaction. The absorbance variation (ΔA) of the butadienyl chain-end was calculated within a time range of 2000 seconds, measured starting from when the maximum concentration of the chain-end was reached: the values reported in Table 1 are expressed as percentage variations calculated with respect to the maximum absorbance.

The temperature of the reaction mixture was set by the thermostat at 70° C. and kept constant within ±4° C. during the whole duration of the experiment. 1 mmole of lithium-n-butyl was then fed to start the polymerization reaction of butadiene. The reaction conditions were maintained for 30 minutes, during which the variation in the absorbance (ΔA) was determined as described above: the results obtained are reported in Table 1.

Example 2

Invention 600 grams of anhydrous cyclohexane, 27 grams of freshly distilled anhydrous butadiene and 100 ppm of 2-methoxy-ethyl-tetrahydrofuran (THFA-ethyl) were charged, in this order, into a stirred 1 liter reactor equipped with a jacket for the circulation of a thermostatic fluid. 1 mmole of tert-butyl acetylene was then introduced. The reactor is equipped with a system for the continuous detection of the UV-Vis absorbing spectra of the polymeric solution, as described in Example 1. The temperature of the reaction mixture was regulated by means of the thermostat at 70° C. and kept constant within ±4° C. for the whole experiment. 2 mmoles of lithium-n-butyl were then fed in order to obtain a molar ratio between lithium acetylide, resulting from the reaction between lithium-n-butyl and tert-butyl acetylene, and lithium-n-butyl active in the polymerization, of about 1:1. The reaction conditions were maintained for 30 minutes, during which the variation in the absorbance (ΔA) was determined, as described above: the results obtained are reported in Table 1.

Example 3

Invention 600 grams of anhydrous cyclohexane, 27 grams of freshly distilled anhydrous butadiene and 100 ppm of 2-methoxy-ethyl-tetrahydrofuran(THFA-ethyl) were charged, in this order, into a 1 liter reactor equipped with a jacket for the circulation of a thermostatic fluid. 2 mmoles of tert-butyl acetylene were then introduced. The reactor is equipped with a system for the continuous detection of the UV-Vis absorbing spectra of the polymeric solution, as described in Example 1. The temperature of the reaction mixture was regulated by means of the thermostat at 70° C. and kept constant within ±4° C. for the whole experiment. 3.3 mmoles of lithium-n-butyl were then fed in order to obtain a molar ratio between lithium acetylide, resulting from the reaction between lithium-n-butyl and tert-butyl acetylene, and lithium-n-butyl active in the polymerization, of about 1.5:1. The reaction conditions were maintained for 30 minutes, during which the variation in the absorbance (ΔA) was determined, as described above: the results obtained are reported in Table 1.

TABLE 1

| Example | Temperature (° C.) | [R—C≡C$^-$Li$^+$]/[n-butLi] | Δ A (%) |
|---|---|---|---|
| 1 (comparative) | 70 | 0 | −27 |
| 2 (invention) | 70 | 0.95 | −12 |
| 3 (invention) | 70 | 1.61 | −8 |

The data reported in Table 1 show that the stability of the living chain-end significantly increases with an increase in the ratio between lithium acetylide [R—C≡C$^-$Li$^+$] and lithium-n-butyl [n-butLi] active in the polymerization.

Example 4

Comparative 8000 grams of an anhydrous mixture of cyclohexane/hexane in a ratio of 9/1 by weight, equal to a filling factor of 80%, 2.02 grams of 2-methoxyethyl-tetrahydrofuran (THFA-ethyl), corresponding to 230 ppm, in a molar ratio of about 4:1 with the theoretical quantity of initiator (i.e. lithium-n-butyl) and, subsequently, 300 grams of styrene and 900 grams of butadiene, were charged into a stirred 16 liters reactor. The reaction mixture obtained was heated to a temperature of 40° C. by means of a heating jacket. 0.25 grams of lithium-n-butyl in anhydrous cyclohexane (1.6 grams of a solution at 15% by weight) were then fed: at this point the heating of the jacket was excluded and the increase in the temperature of the reaction mixture was due to the exothermic nature of the reaction, up to a final temperature (peak temperature) of 80° C. 20 minutes after reaching the peak temperature, in order to eliminate the free monomers at the end of the copolymerization, 0.159 grams of silicon tetrachloride were added, corresponding to the theoretical 100% coupling efficiency. A further 20 minutes elapsed for the completion of the coupling reaction. The polymeric solution obtained was subsequently discharged into a tank where it was stabilized with 0.7 phr of 2,6 di-tert-butylphenol (BHT), 450 grams of non-aromatic oil TDAE (Treated Distillate Aromatic Extract) were added and the whole mixture was sent to the solvent extraction section by stripping with water vapour. The copolymer thus obtained was subjected to the characterization and analysis techniques described above: the results obtained are reported in Table 2.

Example 5

Invention 8,000 grams of an anhydrous mixture of cyclohexane/hexane in a ratio of 9/1 by weight, equal to a filling factor of 80%, 2.02 grams of 2-methoxyethyl-tetrahydrofuran (THFA-ethyl), corresponding to 230 ppm, in a molar ratio of about 4:1 with the theoretical quantity of initiator (i.e. lithium n-butyl) and, subsequently, 300 grams of styrene and 900 grams of butadiene were charged into a stirred 16 liter reactor. The reaction mixture obtained was heated to a temperature of 40° C. by means of a heating jacket. 0.92 grams of tert-butyl acetylene and 0.96 grams of lithium-n-butyl in anhydrous cyclohexane (6.4 grams of a 15% by weight solution) were then fed, for a final molar ratio of lithium acetylide on the lithium alkyl active in the copolymerization, of 3:1: at this point the heating of the jacket is excluded and the increase in the temperature of the reaction mixture was due to the exothermic nature of the reaction, up to a final temperature (peak temperature) of 75° C. 20 minutes after the reaching the peak temperature, in order to eliminate the free monomers at the end of the copolymerization, 0.159 grams of silicon tetrachloride were added, corresponding to the theoretical 100% coupling efficiency. A further 20 minutes elapsed for the completion of the coupling reaction. The polymeric solution obtained was subsequently discharged into a tank where it was stabilized with 0.7 phr of 2,6 di-tert-butylphenol (BHT), 450 grams of non-aromatic oil TDAE (Treated Distillate Aromatic Extract) were added and the whole mixture was sent to the solvent extraction section by stripping with water vapour. The copolymer thus obtained was subjected to the characterization and analysis techniques described above: the results obtained are reported in Table 2.

to 27.5% together with a mixture of antioxidants consisting of Irganox® 565 and Irgafos® 168 in such an amount that the content in the end (co)polymer was 0.1% and 0.4% respectively: the whole mixture was sent to the solvent extraction section by stripping with water vapour. The copolymer thus obtained was subjected to the characterization and analysis techniques described above: the results are reported in Table 3.

Example 7

Comparative

The copolymerization was carried out following the process conditions described in Example 6 but increasing the

TABLE 2

| Example | Sty (%) | 1,2-vinyl (%) | MW AB (Dalton) | WC (%) | $M_n$ (tot.) (Dalton) | $M_p$ (Dalton) | $M_w$ (tot.) (Dalton) | D | $ML^{(1)}$ (dry) | $ML^{(2)}$ (o.e.) |
|---|---|---|---|---|---|---|---|---|---|---|
| 4 (comparative) | 24.8 | 66.5 | 320000 | 80 | 875000 | 1020000 | 970500 | 1.11 | 215 | 86.3 |
| 5 (invention) | 25.3 | 66.1 | 328000 | 95 | 1015000 | 1063600 | 1076000 | 1.06 | 238 | 96.1 |

Sty = content of styrene in the copolymer;
1,2-vinyl = content of 1,2-vinyl units in the copolymer;
MW AB = molecular weight of the copolymer before the addition of silicon tetrachloride (i.e. before the coupling reaction);
WC = coupling efficiency in % by weight;
$M_n$(tot) = number average molecular weight of the copolymer after the addition of silicon tetrachloride (i.e. after the coupling reaction);
$M_p$ = molecular weight corresponding to the highest peak;
$M_w$(tot) = weight average molecular weight of the copolymer after the addition of silicon tetrachloride (i.e. after the coupling reaction);
D = polydispersity index;
ML = Mooney viscosity - $ML^{(1)}$ (dry) was measured before the addition of the non-aromatic oil TDAE - $ML^{(2)}$ (o.e.) was measured after the addition of the non-aromatic oil TDAE.

From the data reported in Table 2, it can be observed that the introduction of the lithium acetylide improved the stability of the living chain-end, allowing much higher coupling efficiencies to be reached.

Example 6

Comparative

The copolymerization was carried out in a pair of reactors of the CSTR type in series, each of them having a volume of 100 liters. The feeding of the reagents was carried out by means of pumps controlled by mass flow-meters. The reagent mixture (anhydrous cyclohexane), monomers (i.e. styrene and butadiene), 2-methoxyethyl-tetrahydrofuran (THFA-ethyl), antifouling agent (i.e. 1,2-butadiene in a molar ratio of 0.3:1 with lithium-n-butyl), was fed to a first stirred reactor, in an inert atmosphere, so that the composition remains constant for the whole duration of the test. The initiator (i.e. lithium n-butyl) was fed directly to the first reactor of the CSTR type of the series. The residence times were controlled by regulating the inlet flow-rates, whereas the reaction temperature was determined by regulating the solvent/monomer mixture and on the basis of the thermal tonality of the reaction.

The copolymerization was carried out following the conditions described above, with residence times of 45 minutes for each reactor. The quantity of lithium-n-butyl fed as initiator was equal to 0.028 grams with respect to 100 grams of monomeric mixture. Under these conditions, the inlet temperature of the first reactor was 48° C. and the outlet temperature of the second reactor was 93° C. After deactivation of the solution containing the polymer, the non-aromatic extender oil TDAE (Treated Distillate Aromatic Extract) was added, using a mixer online, in a quantity equal residence times to 60 minutes for each reactor, in order to reduce the quantity of free monomers present at the end of the polymerization. As in Example 6, a mixture of solvent (i.e. anhydrous cyclohexane)/monomers containing 9% by weight of butadiene and 3% by weight of styrene was fed to a first reactor together with 100 ppm of 2-methoxyethyl-tetrahydrofuran (THFA-ethyl) and antifouling agent (i.e. 1,2-butadiene in a molar ratio of 0.3:1 with lithium-n-butyl). The amount of lithium-n-butyl fed as initiator was equal to 0.028 grams with respect to 100 grams of monomeric mixture. Under these conditions, the inlet temperature of the first reactor was 45° C. and the outlet temperature of the second reactor was 94° C. After deactivation of the solution containing the copolymer, the non-aromatic extender oil TDAE (Treated Distillate Aromatic Extract) was added using a mixer online in a quantity of 27.5% together with a mixture of antioxidants consisting of Irganox® 565 and Irgafos® 168 in such an amount that the content in the end copolymer was 0.1% and 0.4%, respectively: the whole mixture was sent to the solvent extraction section by stripping with water vapour. The copolymer thus obtained was subjected to the characterization and analysis techniques described above: the results obtained are reported in Table 3.

Example 8

Invention

The copolymerization was carried out following the process conditions described in Example 7 with residence times of 60 minutes in each reactor, feeding a mixture of solvent (i.e. anhydrous cyclohexane)/monomers containing 9% by weight of butadiene and 3% by weight of styrene to a first reactor together with 100 ppm of 2-methoxyethyl-tetrahydrofuran (THFA-ethyl) and antifouling agent (i.e. 1,2-butadiene in a molar ratio 0.3:1 with lithium-n-butyl). tert-Butyl acetylene and lithium-n-butyl were fed, in continuous, to a mixer online: the conditions are such as to guarantee a reaction time (i.e. metalation reaction) between the two reagents, of at least 5 minutes, at the end of which the whole mixture was sent to said first reactor.

The quantity of lithium-n-butyl fed was equal to 0.112 grams with respect to 100 grams of monomeric mixture, and the quantity of tert-butyl acetylene was 0.108 grams with respect to 100 grams of monomeric mixture. The molar ratio between lithium acetylide and lithium alkyl active in the copolymerization, was 3:1. Under these conditions, the inlet temperature of the first reactor was 49° C. and the outlet temperature of the second reactor was 92° C. After deactivation of the solution containing the copolymer, the non-aromatic extender oil TDAE (Treated Distillate Aromatic Extract) was added using a mixer online, in a quantity of 27.5% together with a mixture of antioxidants consisting of Irganox® 565 and Irgafos® 168 in such a quantity that the content in the end copolymer was 0.1% and 0.4%, respectively: the whole mixture was sent to the solvent extraction section by stripping with water vapour. The copolymer thus obtained was subjected to the characterization and analysis techniques described above: the results obtained are reported in Table 3.

TABLE 3

| Example | r.t. [min] | R | Sty. [%] | 1,2-vinyl | $M_n$ [dalton] | $M_w$ [dalton] | D | α | [BDE] [ppm] | [Sti] [ppm] |
|---|---|---|---|---|---|---|---|---|---|---|
| 6 (comparative) | 45 | 0 | 26.5 | 24.9 | 242,000 | 651,000 | 2.69 | 0.54 | 70 | 220 |
| 7 (comparative) | 60 | 0 | 26.1 | 24.3 | 239,000 | 657,000 | 2.75 | 0.53 | 120 | 365 |
| 8 (invention) | 60 | 3 | 25.8 | 23.8 | 240,000 | 552,000 | 2.3 | 0.59 | <5 | 27 | r.t. = residence time in each reactor;
R = molar ratio between lithium acetylide and lithium alkyl active in the polymerization;
1,2-vinyl = content of 1,2-vinyl units in the copolymer;
$M_n$ = number average molecular weight;
$M_w$ = weight average molecular weight;
D = polydispersity index;
α = MALLS alpha index;
[BDE] = non-reacted butadiene content at the outlet of the second reactor;
[Sty] = non-reacted styrene content at the outlet of the second reactor.

The data reported in Table 3 show that in Example 6 (comparative) and in example 7 (comparative) the value of the MALLS alpha index (0.54 and 5.3 respectively) and the trend of the radius of gyration with respect to the molecular masses indicate that the branchings are concentrated on the fractions having a high molecular weight, whereas in the case of Example 8 (invention) the value of the MALLS α index (0.59) and the trend of the radius of gyration with respect to the molecular masses reveal a non-significant presence of branchings. The result is supported by the corresponding polydispersity index values (D). With respect to the content of free monomers measured at the outlet of the second reactor, it can be observed that, in the absence of lithium acetylide, the increase in the residence time for each single reactor from 45 to 60 minutes is ineffective for reducing the content of free monomers at the outlet of the second reactor [Example 6 (comparative) and Example 7 (comparative)].

Example 8 (invention), on the contrary, shows that the higher stability of the living chain-ends due to the presence of lithium acetylide makes the increase in the average residence times effective for reducing the content of non-reacted monomers.

The invention claimed is:

1. A process for the preparation of diene polymers or random vinyl arene-diene copolymers which comprises (co)polymerizing, anionically, in the presence of at least one hydrocarbon solvent, at least one conjugated diene monomer and, optionally, at least one vinyl arene, in the presence of at least one lithium-based initiator, at least one aprotic polar compound, and at least one compound containing one or more functional group of the acetylenic type selected from compounds having general formula (II):

wherein $R_2$ represents a hydrogen atom, or is selected from linear or branched $C_1$-$C_{20}$ alkyl groups, $C_3$-$C_{20}$ cycloalkyl groups, $C_6$-$C_{20}$ aryl groups, said alkyl, cycloalkyl and aryl groups optionally containing one or more of oxygen, nitrogen, silicon, and n is an integer ranging from 1 to 10, carrying out a metalation reaction between said lithium-based initiator and said compound containing one or more functional group of the acetylenic type to form lithium acetylide having general formula (III) which is present at the start of (co)polymerization:

wherein said compound containing one or more functional group of the acetylenic type is used in such a quantity that a molar ratio between said lithium-based initiator active in the (co)polymerization and said compound containing one or more functional group of the acetylenic type, after the metalation reaction, ranges from 20 to 0.1.

2. The process for the preparation of diene polymers or random vinyl arene-diene copolymers according to claim 1, wherein said hydrocarbon solvent is selected from n-pentane, n-hexane, n-heptane, cyclohexane, or mixtures thereof.

3. The process for the preparation of diene polymers or random vinyl arene-diene copolymers according to claim 1, wherein said conjugated diene monomer is selected from 1,3-butadiene, isoprene, 2,3-dimethyl-1,3-butadiene, 1,3-pentadiene (piperylene), 2-methyl-3-ethyl-1,3-butadiene, or 1,3-octadiene.

4. The process for the preparation of diene polymers or random vinyl arene-diene copolymers according to claim 1, wherein said vinyl arene is selected from: styrene, α-methylstyrene, 1-vinyl-naphthalene, 2-vinyl-naphthalene, or alkyl derivatives thereof, or mixtures thereof.

5. The process for the preparation of diene polymers or random vinyl arene-diene copolymers according to claim 1, wherein said process is carried out in the presence of:
 a. 60% by weight-100% by weight, with respect to the total weight of the conjugated diene monomer and of the optional vinyl arene, of at least one conjugated diene monomer;
 b. 0% by weight-40% by weight, with respect to the total weight of the conjugated diene monomer and of the optional vinyl arene, of at least one vinyl arene.

6. The process for the preparation of diene polymers or random vinyl arene-diene copolymers according to claim 1, wherein said lithium-based initiator is selected from compounds having general formula (I):

wherein $R_1$ represents a linear or branched $C_1$-$C_{20}$ alkyl group and m is an integer ranging from 1 to 6.

7. The process for the preparation of diene polymers or random vinyl arene-diene copolymers according to claim 6, wherein said lithium-based initiator is selected from: lithium-n-butyl, lithium-n-propyl, lithium-iso-butyl, lithium-tert-butyl, or mixtures thereof.

8. The process for the preparation of diene polymers or random vinyl arene-diene copolymers according to claim 1, wherein said lithium-based initiator is used in a quantity ranging from 0.005% by weight to 0.08% by weight with respect to the total weight of the conjugated diene monomer and optional vinyl arene.

9. The process for the preparation of diene polymers or random vinyl arene-diene copolymers according to claim 1, wherein said aprotic polar compound is selected from: ethyl ether; tetrahydrofuran (THF); ethylene glycol dimethyl ether (dimethylglyme), dioxane, 2-methoxyethyl-tetrahydrofuran (THFA-ethyl), 2-methoxyethyl-tetrahydropyrane (THPA-ethyl); tributylamine; or N,N,N',N'-tetramethylene-ethyl-enediamine (TMEDA).

10. The process for the preparation of diene polymers or random vinyl arene-diene copolymers according to claim 1, wherein said aprotic polar compound is used in a quantity ranging from 0.10 moles to 100 moles per mole of lithium-based initiator.

11. A process for the preparation of diene polymers or random vinyl arene-diene copolymers which comprises (co)polymerizing, anionically, in the presence of at least one hydrocarbon solvent, at least one conjugated diene monomer and, optionally, at least one vinyl arene, in the presence of at least one lithium-based initiator, at least one aprotic polar compound, at least one compound containing one or more functional group of the acetylenic type selected from compounds having general formula (II):

wherein $R_2$ represents a hydrogen atom, or is selected from linear or branched $C_1$-$C_{20}$ alkyl groups, $C_3$-$C_{20}$ cycloalkyl groups, $C_6$-$C_{20}$ aryl groups, said alkyl, cycloalkyl and aryl groups optionally containing one or more of oxygen, nitrogen, silicon, and n is an integer ranging from 1 to 10, and
 in the presence of a lithium acetylide having general formula (III):

wherein said lithium acetylide has been previously formed by a metalation reaction between at least one lithium-based initiator and at least one compound containing said one or more functional group of the acetylenic type, and said lithium acetylide is present at the start of (co)polymerization,
 wherein said compound containing one or more functional group of the acetylenic type is used in such a quantity that a molar ratio between said lithium-based initiator active in the (co)polymerization and said compound containing one or more functional group of the acetylenic type, after the metalation reaction, ranges from 20 to 0.1.

12. The process for the preparation of diene polymers or random vinyl arene-diene copolymers according to claim 1, wherein said compound containing one or more functional groups of the acetylenic type is selected from: acetylene, 1-propyne, 1-butyne, 3-methyl-1-butyne, tert-butylacetylene (or 3,3'-dimethyl-1-butyne), 1-heptyne, 1-octyne, cyclopropylacetylene, cyclopentylacetylene, cyclohexylacetylene, 2-ethynyltoluene, 3-ethynyltoluene, 4-ethynyltoluene, trimethylsilylacetylene, 1,6-heptadyne, 1,7-octadyne, 1,8-nonadyne, propargylether (or dipropynylether), diethynylether, or mixtures thereof.

13. The process for the preparation of diene polymers or random vinyl arene-diene copolymers according to claim 1, wherein said process is carried out in continuous.

14. The process for the preparation of diene polymers or random vinyl arene-diene copolymers according to claim 13, wherein said process is carried out in one or more reactors in series, under isotherm conditions, operating within a temperature range of 30° C. to 120° C., with a control of ±5° C. and with overall residence times ranging from 30 minutes to 130 minutes.

15. A method in which diene polymers or random vinyl arene-diene copolymers obtained by the process according to claim 1 is used in the production of tire treads.

16. A method in which diene polymers or random vinyl arene-diene copolymers obtained by the process according to claim 1 is used in the modification of plastic materials.

* * * * *